Patented Nov. 4, 1924.

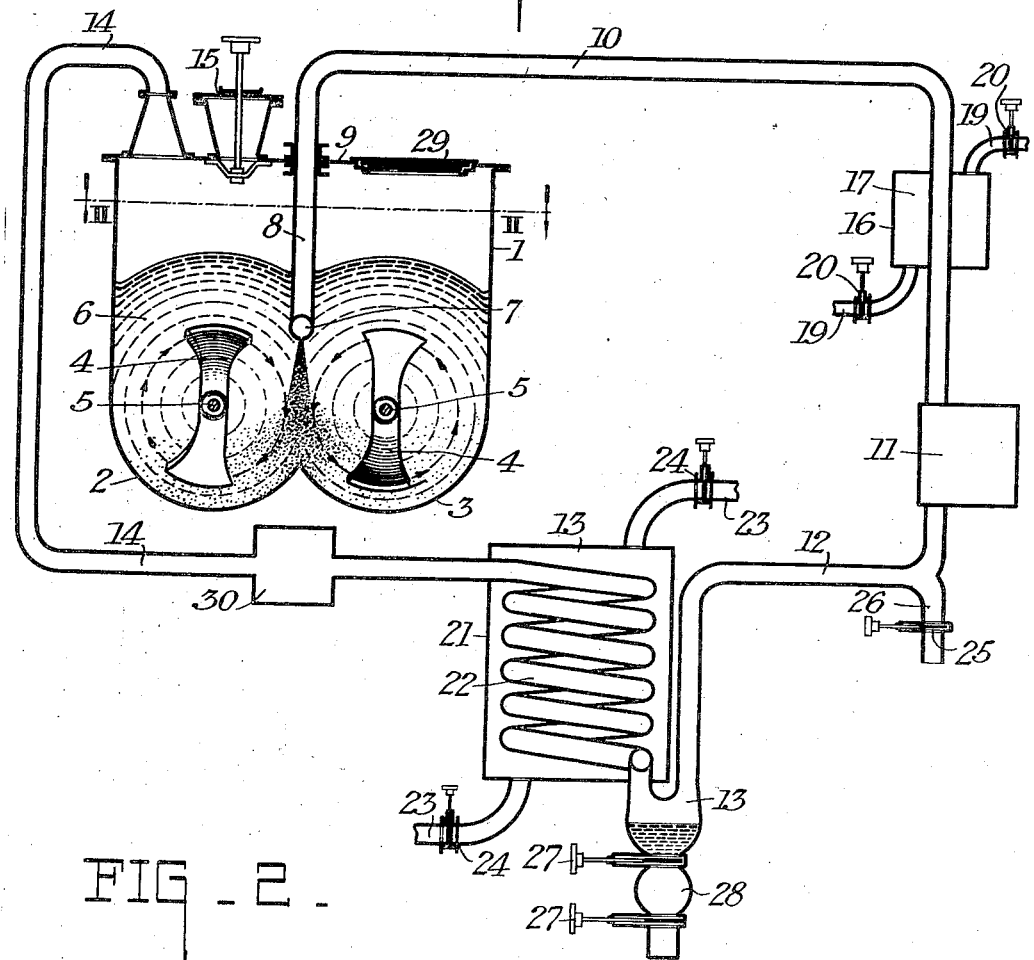

1,514,274

UNITED STATES PATENT OFFICE.

WILLIAM R. WEBB, OF ROCHESTER, NEW YORK, ASSIGNOR TO EASTMAN KODAK COMPANY, OF ROCHESTER, NEW YORK, A CORPORATION OF NEW YORK.

PROCESS OF MANUFACTURING CELLULOSE ACETATE.

Application filed September 15, 1923. Serial No. 662,910.

*To all whom it may concern:*

Be it known that I, WILLIAM R. WEBB, a citizen of the United States of America, residing at Rochester, in the county of Monroe and State of New York, have invented certain new and useful Improvements in Processes of Manufacturing Cellulose Acetate, of which the following is a full, clear, and exact specification.

This invention relates to processes of manufacturing cellulose acetate, particularly those processes in which a volatile mineral acid or its equivalent is used in the reaction mass. One object of the invention is to recover acetic values, such as acetic acid, acetic anhydride, etc., from the reaction mass in a form substantially free from undesirable substances. Another object of the invention is to provide a process in which vapors of acetic values are carried away and recovered without carrying the volatile mineral acids into the recovered values. Still another object of the invention is to react on volatile mineral acids which occur in the reaction mass, so as to obtain relatively non-volatile substances containing the mineral acid radical, which substances cannot pass with the vapors of acetic values through the recovery operations. Other objects will hereinafter appear.

In the accompanying drawing,—

Fig. 1 is a diagrammatic side elevation, partly in vertical section, showing one form of apparatus in which my process may be carried out, the relative sizes of the parts being exaggerated for the sake of clearness;

Fig. 2 is a horizontal sectional view of the mixing unit taken on the line II—II of Fig. 1.

Cellulose acetate is produced by the action of suitable acetylating agents on cellulose in the presence of catalysts. Examples of mixtures of this general type are given in United States Reissue Patent No. 12,637, Miles, Apr. 23, 1907. The reaction is first carried on until a chloroform-soluble cellulose acetate is produced, then a hydrolyzing mixture containing a relatively small amount of water and a hydrolyzing acid, or its equivalent, is introduced into the mass and a hydrolysis conducted until acetone-soluble cellulose acetate is produced. Before the hydrolyzing is carried on the excess or unused acetic anhydride is converted into acetic acid by reaction with the proper amount of water. This can be added separately, or sufficient water can be introduced into the hydrolyzing mixture to "kill" the acetic anhydride and aid in the hydrolysis.

Some times volatile acid materials may be introduced in the reaction mass, even during the chloroform-soluble stage. But such materials are not generally introduced until the hydrolyzing mixture is used. It is highly desirable that the acetic anhydride and the acetic acid be practically free from such volatile acid substances when the acetic values are first used at the beginning of the acetylating reaction. Because of the relatively high value of these acetic values in their sufficiently pure state, their recovery in such state has a very important bearing upon the cost of the cellulose acetate which is finally produced. It has been proposed to recover acetic values from cellulose acetate reaction masses by passing a gaseous vehicle into contact with such masses and then removing or condensing the values from the vehicle. But when volatile acid materials are present, such as hydrochloric acid, the vehicle takes up such acid material along with the acetic values. Consequently such acid material enters into the condensed acetic acid and acetic anhydride to their detriment.

I have found that the recovery of the acetic values free from such undesirable volatile acid substances may be carried out by passing a gaseous vehicle into contact with the reaction mixture to take up vapors of the acetic values and then removing the acetic values from the vehicle, the volatile acid substances some time prior to the final removal step being combined or "killed" by reacting with a salt which produces a substantially non-volatile compound with said acid substance. In the preferred form of my invention I have found that such volatile acid substances as hydrochloric acid can be readily rendered harmless by reacting upon sodium acetate or other metallic salt of acetic acid, generally in a powdered form. This reaction may take place in the main reaction mixture itself, or it may be effected by passing the vapor-laden vehicle, such as air, through a scrubbing tower containing a solution of sodium acetate or other metallic salt of acetic acid in glacial acetic acid, or even dry sodium acetate arranged to present a large surface.

My process may be carried out in many types of apparatus, the one shown in the drawing being merely illustrative. The main receptacle in which the gaseous vehicle and reaction mixture are brought into intimate contact is indicated at 1. This is preferably an airtight vessel, except for the piping hereinafter described. It may conveniently take the form of a well known mixer in which the bottom is divided into two troughs 2, 3 above which are located mixing blades 4 rotated with shafts 5, driven by any suitable means (not shown). These blades may be of a form which merely turns the material about the shafts, but I prefer to use blades which give a longitudinal movement to the mixture also. See, for example, U. S. Patent No. 534,968, Pleiderer, Feb. 26, 1895. The receptacle may be temperature controlled by steam jackets or coils or any other well known and customary way.

Entering into the reaction mixture 6 is a perforated transverse pipe 7. This connects with a vertical pipe 8 which passes through an airtight connection in the top 9. Pipe 8 is in turn connected by pipe line 10 with an air compressor or blower 11. The latter draws its supply of air through pipe 12 from the removal or recovery unit 13, which is in turn connected by pipe 14 with the top 9 of receptacle 1. In the top 9 of the receptacle 1 there is also located a normally closed or sealed loading fixture or pipe 15.

I find it useful to have a heating unit 16 for slightly warming the gaseous vehicle before it enters the main mixing receptacle 1. This is indicated diagrammatically in the drawing as a casing 17 surrounding a section of pipe 10, through which warm water or exhaust steam is passed through pipe 19 controlled by valves 20. The removal station 13, where vapors of acetic values (usually the vapors of acetic acid) are separated from the air, may take the form of any well known absorption or condensation tower. This is conventionally indicated in Fig. 1 as a cooling chamber 21 surrounding a coil 22, the cooling medium being passed in and out by means of pipes 23 controlled by valves 24. The entrance of additional air when required may be conveniently effected by manipulating valve 25 in pipe 26.

Intermediate the length of the pipe 14 is located scrubbers 30 of any suitable type containing the salt, such as sodium acetate, which reacts with the volatile acid material, such as hydrochloric acid. The vapor-laden air may be bubbled through a solution of sodium acetate in glacial acetic acid (say 5 to 8%), or it may be passed over thin layers of powdered sodium acetate.

In carrying out my process in this apparatus a reaction mixture such as that shown in the Miles patent cited above, but with highly concentrated hydrochloric acid wholly or partially replacing the sulfuric acid during the hydrolyzing stage, is present in receptacle 1, perforated pipe 7 being below the surface of the charge. Fused granulated or powdered sodium acetate is then mixed into the reaction mass, so as to convert substantially all of the hydrochloric acid into sodium chloride, at the same time liberating an equivalent amount of acetic acid. For each 100 parts of a solution of hydrochloric acid at 34% concentration are used at least 84 parts of fused anhydrous sodium acetate. I prefer to use a 10 to 50% excess of sodium acetate above the quantity named. Where sulfuric acid is present, it may be reacted upon also by adding sodium acetate in the proportion of 164 parts of the latter to 98 parts of the acid. But here again it is preferable to use from 10 to 50% excess of the sodium acetate.

The sodium acetate is introduced through pipe 15 to the mass, and the blades 4 are kept in operation to thoroughly mix the mass and bring about the reaction homogeneously. The compressor or blower 11 forces air through pipes 10, 8, and 7 into the reaction mixture 6. The bubbles thus formed in the mixture take up vapors of acetic values, but no vapors of volatile mineral acids, such as hydrochloric acid, are taken up, because of the formation of substantially non-volatile sodium chloride. It is convenient to operate with the receptacle 1 at a temperature around 80 to 85° F. but there is considerable latitude with regard to this, as will be understood by those skilled in the art.

The vapor-laden vehicle is drawn through pipe 14 and scrubber 30 to the removal zone 13, where the vapors are condensed and drawn off through valves 27 and enlarged pipe 28. The condensation temperature is adjusted so as not to clog the apparatus with solid products, 60° F. being ordinarily useful. After leaving the condenser the air may, if desired, be warmed up by means of the heating unit 16 to the proper temperature for use in the receptacle 1.

The volatile acid substances, such as hydrochloric acid, may be entirely fixed within container 1, thus making the use of scrubber 30 unnecessary, or the addition of sodium acetate to the reaction mass 6 may be wholly omitted, thus permitting volatile acid to travel with the acetic values to the condenser 30, where they react with sodium acetate and are fixed, sodium acetate being formed and acetic acid being given off. It is also useful to add sodium acetate to the reaction mass in vessel 1 and then rely on scrubber 30 to catch any traces of hydrochloric acid which may happen to get into the current of air. In any event, the reaction between the undesirable volatile acid substance and the salt is carried out before the final removal or condensation of the vapors of acetic values from the gaseous vehicle.

Having thus described my invention, what I claim as new and desire to secure by Letters Patent is:

1. In the manufacture of cellulose acetate, the steps of producing a cellulose acetate reaction mixture initially containing volatile acetic values and a volatile acid hydrolyzing substance, passing a gaseous vehicle into contact with said acetic values of the reaction mixture to take up vapors thereof, separating acetic values from the vapor-laden vehicle, and reacting on said acid substance at a stage of the process after the production of said reaction mixture and prior to completion of said separating step with a salt which is substantially free from reaction upon said acetic values and produces a substantially non-volatile compound with said acid substance.

2. In the manufacture of cellulose acetate, the steps of producing a cellulose acetate reaction mixture initially containing volatile acetic values and a volatile mineral acid, passing a gaseous vehicle into contact with said acetic values of the reaction mixture to take up vapors thereof, separating acetic values from the vapor-laden vehicle, and reacting on said mineral acid at a stage of the process after the production of said reaction mixture and prior to completion of said separating step with a salt of acetic acid to liberate acetic acid from said salt and form a substantially non-volatile salt of said mineral acid.

3. In the manufacture of cellulose acetate, the steps of producing a cellulose acetate reaction mixture initially containing acetic acid and a volatile mineral acid, passing a gaseous vehicle into contact with the acetic acid of the reaction mixture to take up vapor of said acetic acid, separating acetic acid from the vapor-laden vehicle, and reacting on said mineral acid at a stage of the process prior to completion of said separating step with a salt of acetic acid to liberate acetic acid from said salt and form a substantially non-volatile salt of said mineral acid.

Signed at Rochester, New York, this 7th day of Sept., 1923.

WM. R. WEBB.